(12) United States Patent
Rosner et al.

(10) Patent No.: US 9,183,587 B1
(45) Date of Patent: Nov. 10, 2015

(54) SINGLE OBJECT SYSTEM, METHOD, AND COMPUTER PROGRAM FOR STORING INFORMATION ASSOCIATED WITH USER INTERACTIONS WITH A GOOD OR SERVICE

(75) Inventors: Dov Rosner, Kfar Yona (IL); Avner Laufer, Petach Tikva (IL)

(73) Assignee: Amdocs Software Systems Limited, Dublin (IE)

( * ) Notice: Subject to any disclaimer, the term of this patent is extended or adjusted under 35 U.S.C. 154(b) by 1337 days.

(21) Appl. No.: 12/399,785

(22) Filed: Mar. 6, 2009

(51) Int. Cl.
  G06Q 30/06 (2012.01)
  G06Q 30/02 (2012.01)
  G06F 3/0481 (2013.01)
  H04L 29/06 (2006.01)

(52) U.S. Cl.
  CPC ................... *G06Q 30/0641* (2013.01)

(58) Field of Classification Search
  USPC .......... 707/743, 772, 792, 915, 917, 999.003, 707/999.005, 999.102, 999.103, E17.018, 707/999.01; 709/207; 463/19; 705/26.62, 705/26.8, 27.1; 715/745
  See application file for complete search history.

(56) References Cited

U.S. PATENT DOCUMENTS

| | | | |
|---|---|---|---|
| 6,950,828 B2 * | 9/2005 | Shaw et al. | 707/743 |
| 7,107,226 B1 * | 9/2006 | Cassidy et al. | 705/26.8 |
| 7,133,867 B2 | 11/2006 | Irle et al. | 707/4 |
| 7,730,151 B1 * | 6/2010 | Fabbri et al. | 709/207 |
| 2006/0052154 A1 * | 3/2006 | Boerner | 463/19 |

OTHER PUBLICATIONS

Specor Pro 2008 Press Release, Spector Pro 2008 Keeps Tabs on Popular But Potentially Dangerous Social Networking Sites, Feb. 4, 2008.*
"How Internet Cookies Work", Jan. 28, 2001,http//www.howthingswork.com/cookie.htm?printable=1 (1 of 7) [Jan. 28, 2001 22:02;37].*
Warkentin, Merrill; A Framework for Spyware Assessment; Communications of the ACM; Aug. 2005/vol. 48. No. 8; pp. 79-84.*
Spector Pro 2008 Press Release, Spector Pro 2008 Keeps Tabs on Popular But Potentially Dangerous Social Networking Sites, Feb. 4, 2008.*

* cited by examiner

*Primary Examiner* — Matthew Gart
*Assistant Examiner* — Reva R Danzig
(74) *Attorney, Agent, or Firm* — Zilka-Kotab, PC

(57) ABSTRACT

A single object system, method, and computer program product are provided for storing information associated with user interactions with a good or service. In use, a plurality of user interactions with one of a good and a service are received via a graphical user interface. Furthermore, information associated with the user interactions is stored in a single object.

11 Claims, 12 Drawing Sheets

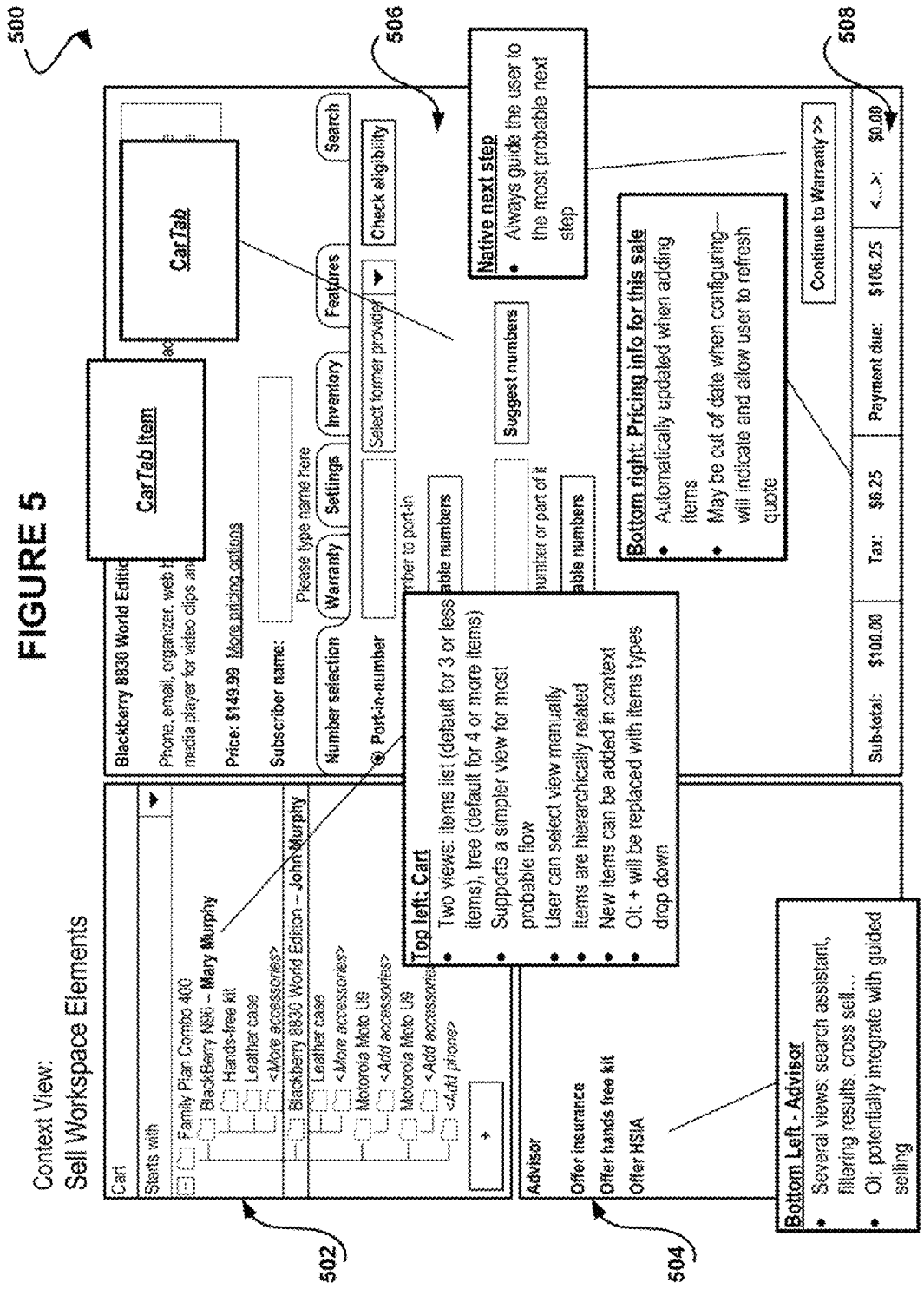

SINGLE OBJECT SYSTEM, METHOD, AND COMPUTER PROGRAM FOR STORING INFORMATION ASSOCIATED WITH USER INTERACTIONS WITH A GOOD OR SERVICE

FIELD OF THE INVENTION

The present invention relates to user interactions with goods and/or services, and more particularly to storing information associated with user interactions with goods and/or services.

BACKGROUND

Applications have been adapted for enabling browsing of goods and/or services, for example, over the Internet. In some cases, these applications even allow electronic transactions, such as purchases, of goods and/or services. However, conventional applications that provide such browsing and electronic transactions have exhibited various limitations.

Just by way of example, a catalog capable of being searched for goods and/or services has generally been separate from virtual shopping cart capable of storing goods and/or services selected for purchase. Thus, an indication of goods and/or services searched has traditionally not been stored for future user access, while goods and/or services selected for purchase have been stored for future user access via the virtual shopping cart. There is thus a need for addressing these and/or other issues associated with the prior art.

SUMMARY

A single object system, method, and computer program product are provided for storing information associated with user interactions with a good or service. In use, a plurality of user interactions with one of a good and a service are received via a graphical user interface. Furthermore, information associated with the user interactions is stored in a single object.

BRIEF DESCRIPTION OF THE DRAWINGS

FIG. 5 shows a graphical user interface for displaying information associated with user interactions with a good or service that is stored in a single object, in accordance with yet another embodiment.

FIGS. 6A-G show graphical user interfaces (GUIs) for associating a good and/or service with an object, in accordance with another embodiment.

DETAILED DESCRIPTION

Figure 1:
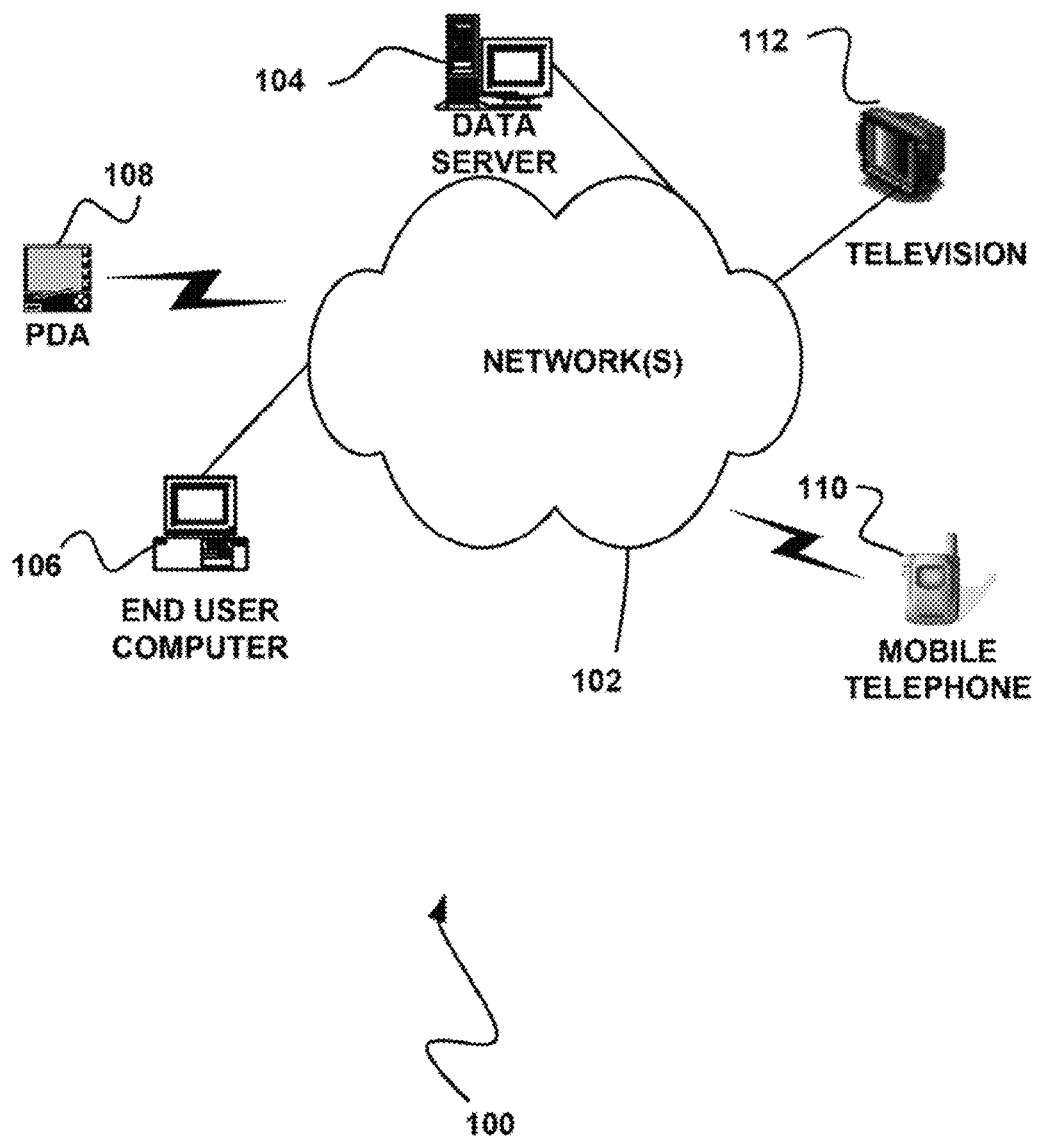
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
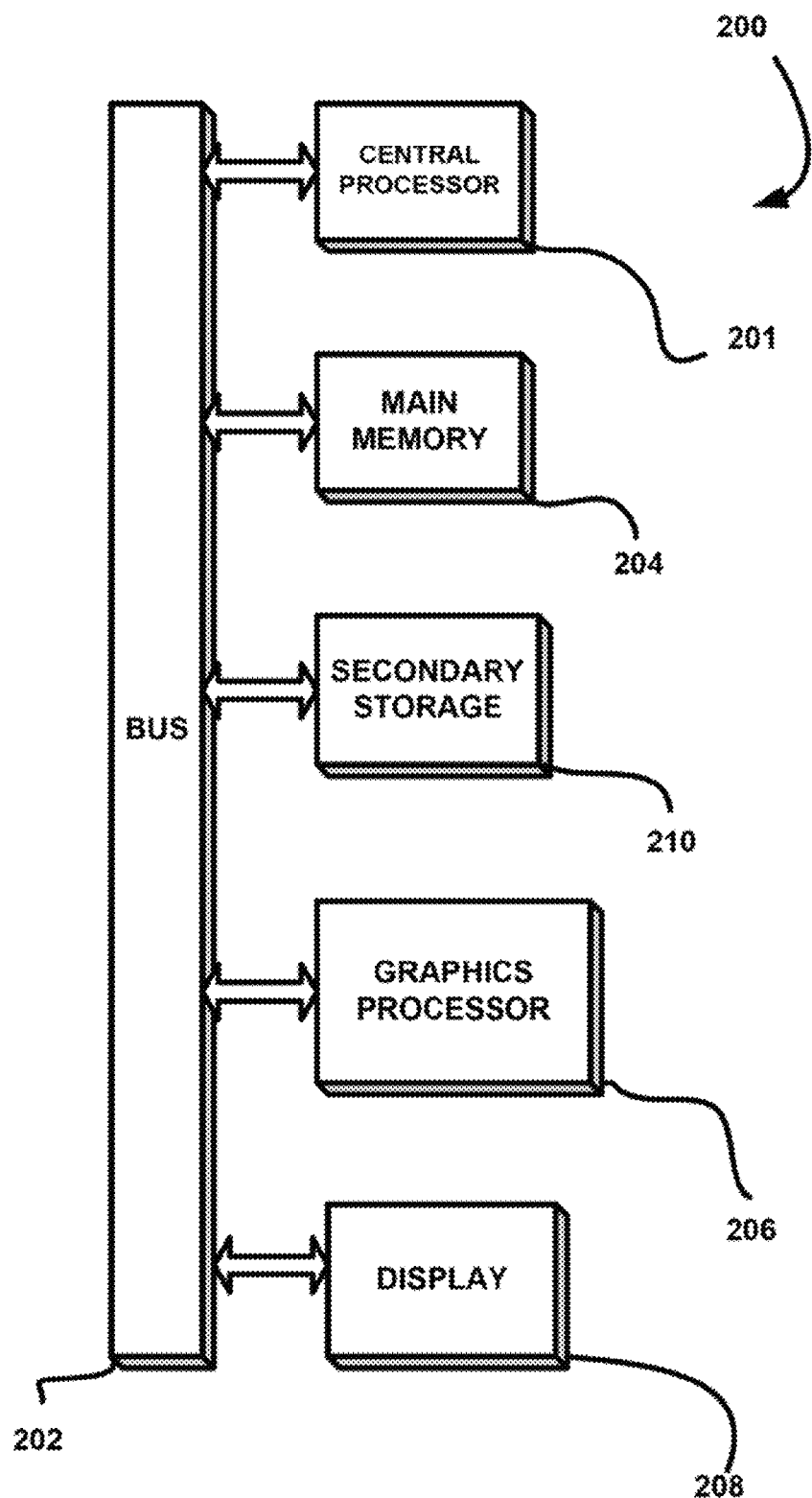
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
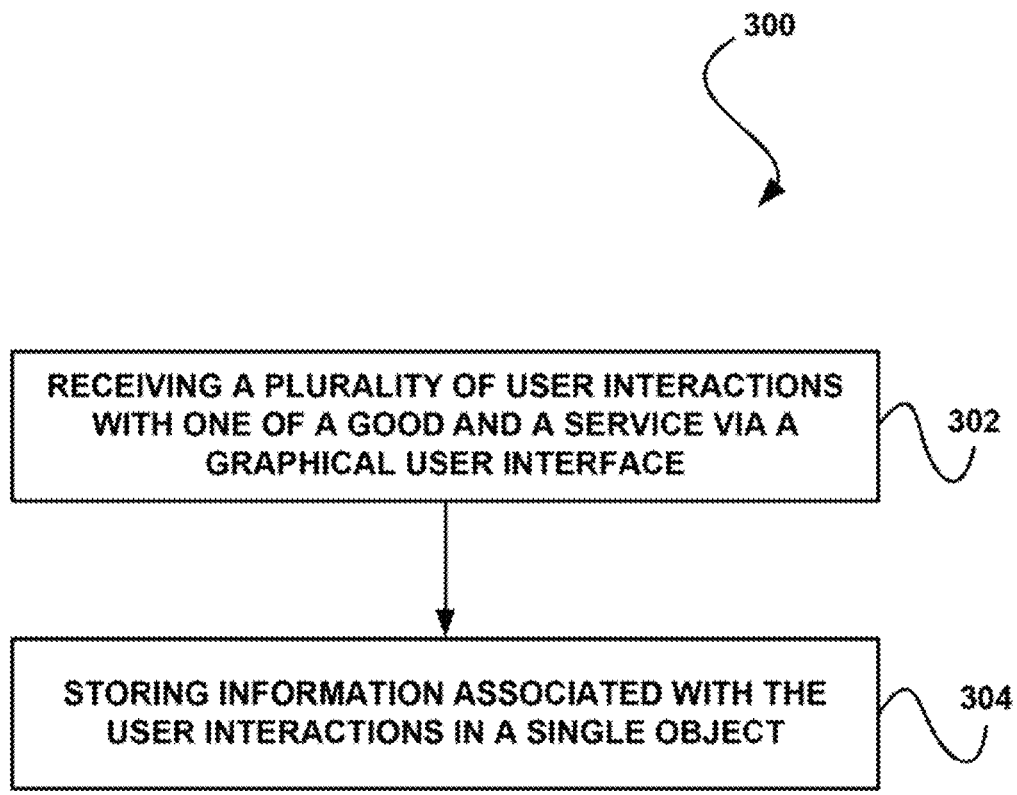
FIG. 3 shows a method for storing information associated with user interactions with a good or service in a single object, in accordance with one embodiment.

FIG. 3 shows a method 300 for storing information associated with user interactions with a good or service in a single object, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a plurality of user interactions with one of a good and a service are received via a graphical user interface (GUI). With respect to the present description, the good may include any virtual representation of a good, for example, a mobile telephone, a computer, and/or any other object. Additionally, the service may include any virtual representation of a service, such as an Internet service, a mobile telephone service, and/or any other service, with respect to the present description.

In one embodiment, the user interactions may include submitting a search for the good or the service. For example, the search may be submitted by querying a catalog, database, etc. for the good or the service. As another example, the search may be submitted by entering at least one search term in a search field of the GUI (e.g. where, upon submission of the search term, the search term is utilized to query the catalog, database, etc. for goods and/or services associated with the search term).

In another embodiment, the user interactions may include selecting the good or the service. Just by way of example, a list of goods and/or services may be displayed (e.g. via the GUI). Optionally, the list may be displayed as a result of the submission of the search for the good or the service. Thus, the good or the service may be selected from a display thereof via the GUI.

In yet another embodiment, the user interactions may include viewing a description of the good or the service. For example, the GUI may display the description of the good or the service, such as at least one image of the good or the service, text describing the good or the service, etc. As an option, the description may be displayed in response to the user selection of the good or the service.

In still yet another embodiment, the user interactions may include selecting an option to purchase the good or the service. In one exemplary embodiment, the GUI may be associated with an application [e.g. an electronic commerce (eCommerce) application capable of being utilized for performing an electronic transaction (e.g. a purchase) associated with the good or the service]. For example, the GUI may include a web page (e.g. of an eCommerce website).

To this end, the user interactions may optionally include selecting an option of the GUI to purchase the good or the service, where the purchase is carried out utilizing the application. In another embodiment, the user interactions may include purchasing the good or the service. For example, the GUI may include an electronic commerce (eCommerce) GUI capable of being utilized for performing an electronic transaction (e.g. a purchase) associated with the good or the service. To this end, the user interaction may optionally include selecting an option to purchase the good or the service, where the purchase is carried out utilizing the GUI.

Furthermore, the user interactions may include storing the good or the service in a virtual shopping cart. For example, a user may select an option associated with the good or the service via the GUI (e.g. an option to purchase the good or the service, an option to save the good or the service in the virtual shopping cart, etc.), and the good or the service may be automatically stored in the virtual shopping cart in response thereto. With respect to the present embodiment, the virtual shopping cart may include any object for storing goods and/or services, whereby selection of the object may provide a user with access to the goods and/or services stored therein.

In another embodiment, the user interactions may include configuring the good or the service. As an option, at least one aspect of the good or the service may be configurable. Accordingly, the user interactions may include configuring any configurable aspect of the good or the service via the GUI. In one exemplary embodiment, the GUI may include a field associated with each configurable aspect of the good or the service, such that a user may enter a value in each field for configuring the good or the service.

In yet another embodiment, the user interactions may include comparing the good or the service with at least one of another good and another service. For example, the GUI may include an option to compare (e.g. descriptions of, etc.) the good or the service with at least one other good or service of the same type, of the same manufacturer/service provider, etc. Thus, upon selection of the option, the good or the service may be compared to at least one other good or at least one other service. Optionally, the one other good or service may be automatically selected for comparison based on input received from a user (e.g. a search term, a model number, a good/service identifier, etc.). In this way, the good or the service and the other good or the other service may be compared.

It should be noted that while various examples of user interactions have been described above, any type of interaction capable of being performed by a user with respect to the good or the service may be received. Furthermore, the user interactions may be received via the GUI in any desired manner. For example, the user interactions may include selection of an option (e.g. an option to compare goods/services, an option to purchase the good/service, etc.), viewing of the GUI, inputting values into the GUI (e.g. for configuring the good/service), etc.

Moreover, information associated with the user interactions is stored in a single object, as shown in operation 304. The single object may include any allocated portion of memory for storing information associated with the user interactions. For example, the object may include an object of an object-oriented programming model. As another example, the object may include a persistent object (e.g. persistent with respect to the good or service).

In addition, the object may be particular to the good or the service for which the user interactions are received. Just by way of example, the object may be created for the good or the service, upon a first received user interaction with the good or the service, etc. Thus, a different object may be instantiated for each good or service for which user interactions are received. As an option, the single object may be stored in a database of objects, etc. As another example, the object may be deleted upon a final received user interaction, such as a purchase of the good or service, a last received user interaction with a predetermined period of time, etc.

In one embodiment, the information associated with the user interactions may identify the user interactions. For example, an identifier of each of the user interactions may be stored in the object. In another embodiment, the information associated with the user interactions may identify the good or the service for which the user interactions are received. Just by way of example, the identifier of the good or the service may include a model number, a title, and/or any other identifier (e.g. unique identifier) for the good or the service.

In yet another embodiment, the information associated with the user interactions may identify another good and/or another service (e.g. utilizing an identifier thereof, etc.). As an option, the other good and/or other service may be associated with at least one of the user interactions. For example, the other good and/or other service may be associated with a user interaction in which goods and/or services were compared.

In still yet another embodiment, the information associated with the user interactions may include a result of at least one of the user interactions. For example, if the user interaction includes a search, then results of the search (e.g. a list of goods and/or services resulting from a search query) may be stored in the object. As another example, if the user interaction includes a comparison, then results of the comparison (e.g. a GUI displaying the comparison, etc.) may be stored in the object.

Of course, while various examples of information associated with the user interactions that may be stored in the object have been described above, it should be noted that any desired information that is associated with the user interactions may be stored in the object. In this way, the information associated with the user interactions with the good or the service may be accessible via the single object. Such accessibility may allow the information to be utilized to automatically re-enact the user interactions, retrieve results of the user interactions, etc., thus preventing a user from necessarily being required to manually repeat the interactions (e.g. when a result of a previous interaction is desired to be retrieved). In this way, efficiency of a retail agent (e.g. computer system, etc.) associated with a good and/or service provider for enabling (e.g. providing) the user interactions with the good or service may be optimized.

As an option, the information may be displayed (e.g. via another GUI). For example, the information may be displayed to the user, such that the user may view the information associated with the user interactions. In one embodiment, the information may be displayed in response to a user selection of an option (e.g. via the GUI in which the user interactions are received) to view the information. Of course, in another embodiment, the information may be automatically displayed, such as, for example, in window pane separate from the GUI via which the user interactions are received.

In one embodiment, the information may be displayed as a plurality of links. Just by way of example, each of the links may be associated with a different one of the user interactions. Optionally, each link may include an identifier of the user interaction.

In another embodiment, upon selection of one of the links, a result of an associated one of the user interactions may be displayed. For example, the result may include a result of a previously performed search (e.g. a list of goods and/or services resulting from a search query). As another example, the result may include a result of a previously performed comparison.

In one exemplary embodiment, a user may search for a particular good (e.g. mobile phone), for example, utilizing at least one keyword. Thus, a result of the search may be provided to the user, where the result includes the particular good. Further, the user may compare the particular good with at least one other good. The search and the comparison may be stored in a single object associated with the good. At any point in time after the comparison, the user may automatically return to (e.g. request) a result of the comparison (e.g. by selecting an option associated with the comparison), where the comparison is retrieved from the object in which it is stored. If desired, the user may select the other good for purchase via on the provided (e.g. displayed) result of the comparison. The other good may replace the first good (e.g. in a virtual shopping cart, etc.) automatically and a configuration of the first good (as customized by the user) may be automatically migrated to the other good.

In another exemplary embodiment, a user of a computer system may compare a plurality of products, and the comparison may be stored in a single object. After the comparison, the user may search for a different good or service not included in the comparison. Such search may be stored in a different object. Still yet, the user may automatically return to a result of the comparison of the plurality of products that was previously performed by selecting an option for such comparison, where the comparison is retrieved from the object.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
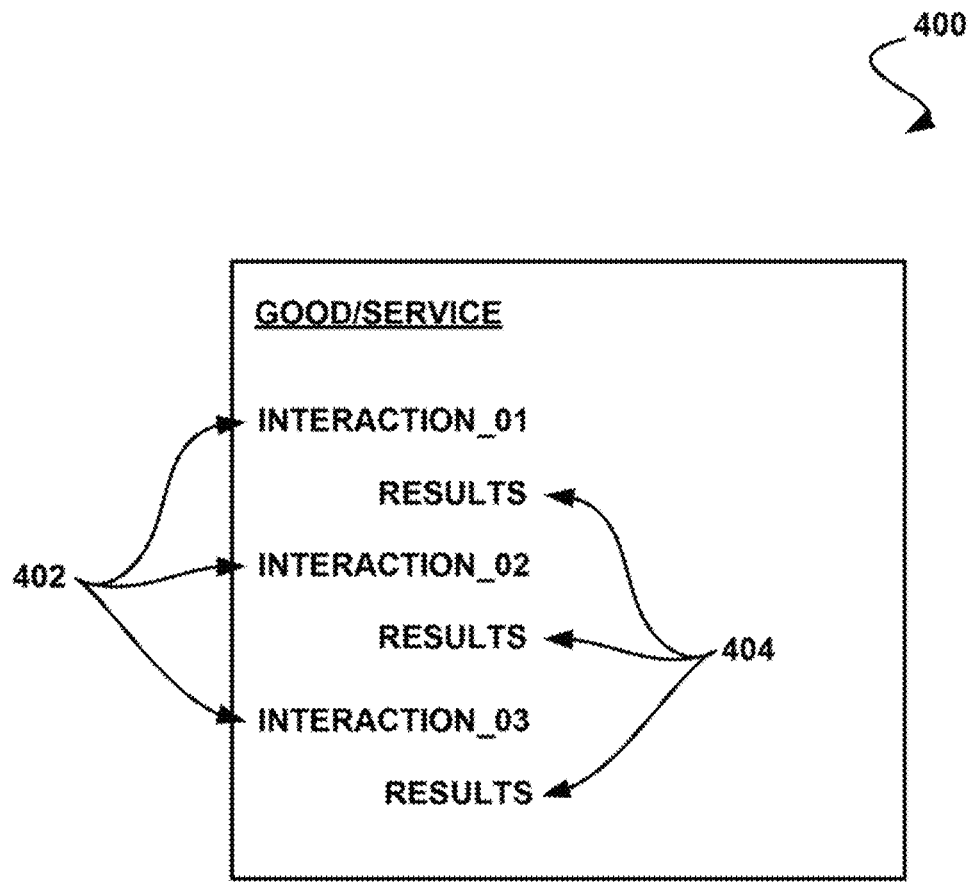
FIG. 4 shows a single object for storing information associated with user interactions with a good or service, in accordance with another embodiment.

FIG. 4 shows a single object 400 for storing information associated with user interactions with a good or service, in accordance with another embodiment. As an option, the single object 400 may be implemented in the context of the details of FIGS. 1-3. For example, the single object 400 may include the single object utilized in operation 302 of FIG. 3 to store information associated with user interactions with a good and/or service. Of course, however, the single object 400 may be carried out in any desired environment. Again, the aforementioned definitions may equally apply to the description below.

As shown, the single object 400 is particular to a good or a service. The single object 400 may include an object created utilizing an object-oriented programming language (e.g. Java™, etc.). For example, the single object 400 may be persistent with respect to the good or the service.

In one embodiment, the single object 400 may be created (e.g. instantiated) upon a search for the good or the service, upon a selection of the good or the service (e.g. from a catalog), etc. Of course, however, the single object 400 may be created upon any desired initial user interaction with the good or service via a GUI. For example, the single object 400 may be created for the good or service if a user interaction with the good or service matches a user interaction predetermined to be a basis for creating an object.

In another embodiment, the single object 400 may be deleted (e.g. from memory) upon a purchase of the good or the service, a selection of another good or service, etc. However, it should be noted, the single object 400 may be deleted upon any desired final user interaction with the good or service via a GUI. For example, the single object 400 may be deleted if a user interaction with the good or service matches a user interaction predetermined to be a basis for deleting an object.

As also shown, the single object 400 includes information associated with a plurality of user interactions. Each of the user interactions may include a different user interaction performed with respect to the good or the service. Just by way of example, the user interactions may include a search for the good or service, a selection of the good or service for purchase, a comparison of the good or service, a configuration of the good or service, etc.

In one embodiment, the single object 400 may store an identifier 402 of each user interaction. The identifier may include a unique identifier for each user interaction, as an option. For example, the identifier may include a name of the user interaction (e.g. including a type of the user interaction, such as search, compare, etc.).

Optionally, the single object 400 may include a result 404 of the each of the interactions. Thus, for example, if the user interaction includes a search for the good or service, the result may include a search result (e.g. a list of goods or services identified based on the search). As another example, if the user interaction includes a comparison of the good or service, the result may include any information associated with the comparison, such as another good or service on which the comparison is based, the actual, data compared, etc.

To this end, the single object 400 may be utilized for storing information associated with user interactions performed with respect to a good or a service. The information associated with a user interaction may be automatically stored in the single object 400 in response to the performance of the user interaction, as an option. Moreover, the information stored in the single object 400 may be displayed to a user, such that the user may optionally select information associated with any one of the user interactions for repeating such selected user interaction, for retrieving results of such selected user interaction, etc.

FIG. 5 shows a graphical user interface (GUI) 500 for displaying information associated with user interactions with a good or service that is stored in a single object, in accordance with yet another embodiment. As an option, the single GUI 500 may be implemented in the context of the details of FIGS. 1-3. Of course, however, the GUI 500 may be implemented in any desired environment. Yet again, the aforementioned definitions may equally apply to the description below.

With respect to the present embodiment, the GUI 500 may include an interface capable of being utilized by a user to purchase a good or a service. In one embodiment, the GUI 500 may include a web page. For example, the web page may be included in an eCommerce website.

As shown, the GUI 500 includes a plurality of window panes 502-508. A first window pane 502 may display a virtual shopping cart of a user. Accordingly, the first window pane 502 may display any number of goods and/or services selected for purchase (e.g. via another GUI, another window pane, etc.) by the user. As an option, the goods and/or services in the virtual shopping cart may be displayed hierarchically. Moreover, in one embodiment, the virtual shopping cart may hold objects, where each object is representative of a good or service (each good and service hereinafter referred to as a carTab item, the term reflecting a cart and tablet). Each object may include a separate page stored in the virtual shopping cart. In another embodiment, the virtual shopping cart may hold a search history (e.g. of a search performed by the user). Optionally, the virtual shopping cart may hold the search history without holding any goods or services. In this way, the virtual shopping cart may be utilized to change a good and/or service via the search history which was utilized to locate such good and/or service, to create several purchasing options resulting from different searches (e.g. goods and/or services which may be later chosen from for purchase), etc.

In one embodiment, the carTab items may be grouped (e.g. by category, etc.) into expandable groups. In another embodiment, the carTab items may be grouped if the number of carTab items exceeds a threshold amount (e.g. 4 good/services). Optionally, a format of the carTab items displayed in the first window pane 502 may be configured by the user (e.g. via a drop down menu, etc.).

Each carTab item may be associated with a different object, where such object stores information associated with user interactions (performed via a GUI) with the carTab item. Additionally, each carTab item may be represented in the first window pane 502 as a link. Thus, upon selection of the carTab item, information stored in the object associated therewith may optionally be displayed on a third window pane 506, as described in more detail below.

The second window pane 504 displays a plurality of links associated with an advisor. For example, the second window pane 504 may display a plurality of links to offers that may be selected by the user. In various embodiments, the offers may include advertisements, assistants for retrieving help, filters, related goods/services, etc.

As noted above, the third window pane 506 may display information stored in the object associated with a carTab item. Of course, however, the third window pane 506 may display information stored in an object associated with any good/service capable of being selected by the user, such that the information may be displayed in the third window pane 506 upon a selection of the good/service.

The information displayed may include data associated with the carTab item, such as a description of the carTab item, a price of the carTab item, a warranty associated with the carTab item, features of the carTab item, etc. Optionally, any of such information may be displayed via a plurality of tabs, such that selection by the user of one of the tabs results in display of the information associated with such tab (e.g. displaying warrant information upon selection of a warranty tab, etc.).

In addition, the information displayed may include configurable data, such as customizable settings of the carTab item (e.g. a phone number of a mobile phone, etc.). As an option, an input field may be displayed for each different portion of configurable data, such that the user may provide a configuration for such portion. Further, the information displayed may include identifiers of user interactions with the carTab item, such as a search previously performed with respect to the carTab item, a comparison Previously performed with respect to the carTab item, etc.

Still yet, the third window pane 506 may display an option to proceed to a next GUI (e.g. for display in the third window pane 506). The next GUI may be selected based on the information displayed via the third window pane 506 (e.g. by analyzing the information displayed via the third window pane 506 and determining a GUI associated with a most probable user interaction desired to be performed by the user). Just by way of example, if the information displayed via the third window pane 506 includes configurable data, selection of the next GUI option may result in a GUI being displayed for purchasing the configured good/service.

Moreover, a fourth window pane 508 may display a total price for the carTab items displayed in the first window pane 502 (e.g. included in the virtual shopping cart). The total price may be automatically updated based on the carTab items displayed in the first window pane 502 (e.g. included in the virtual shopping cart). Further, the total price may be automatically updated based on a configuration of the carTab item displayed in the first window pane 502 or may optionally be manually updated based on selection by a user of a total price refresh option.

In one exemplary embodiment, a user may select to add an object (e.g. a specific object via a link in the virtual shopping cart, an open search via the '+' option in the virtual shopping cart, etc.). Upon the selection, a new object (e.g. the GUI 500) may be opened with a search tab. The search tab may allow a catalog of goods and/or services to be searched, and associate a good and/or service with the object. One example of the aforementioned exemplary embodiment is shown in the GUIs 600-660 of FIGS. 6A-6G.

Figure 6A:
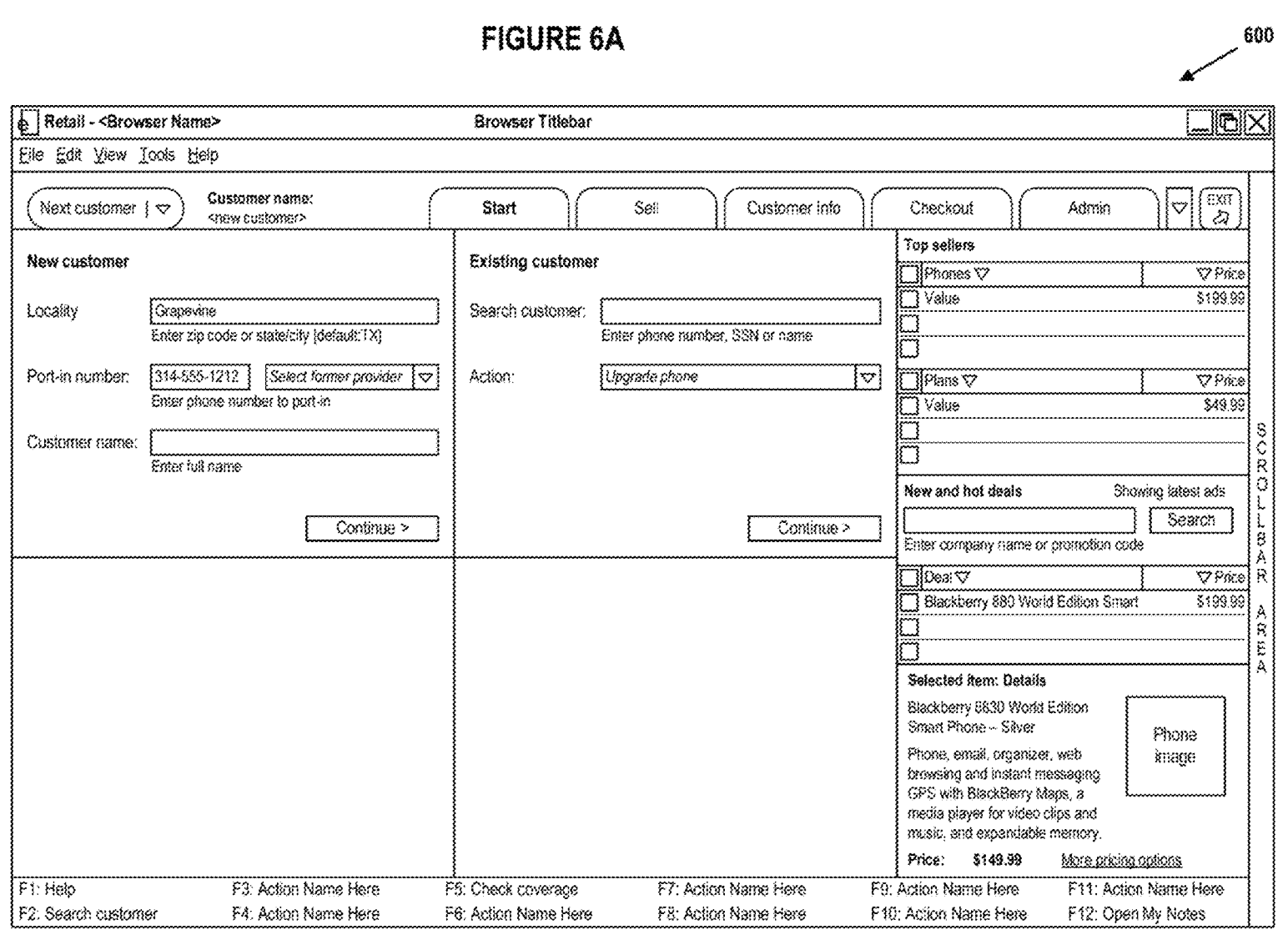

Initially two users (hereinafter John and Mary Murphy) enter a retail store (hereinafter Purple CSP Retail Store), approach a store agent (hereinafter Rick) located behind a counter of the Purple CSP Retail Store, and ask Rick for the best offer for a service that is available for each of them and their two children (e.g. each person being a separate subscriber to the service offered by the Purple CSP Retail. Store). The GUI 600 shown in FIG. 6A is presented to Rick for entering in customer information John and Mary. Based on the fields of the GUI 600, Rick receives the home address zip code for the Murphy's and enters the city associated therewith (as shown, but may also optionally enter the zip code) in the GUI 600.

Figure 6B:
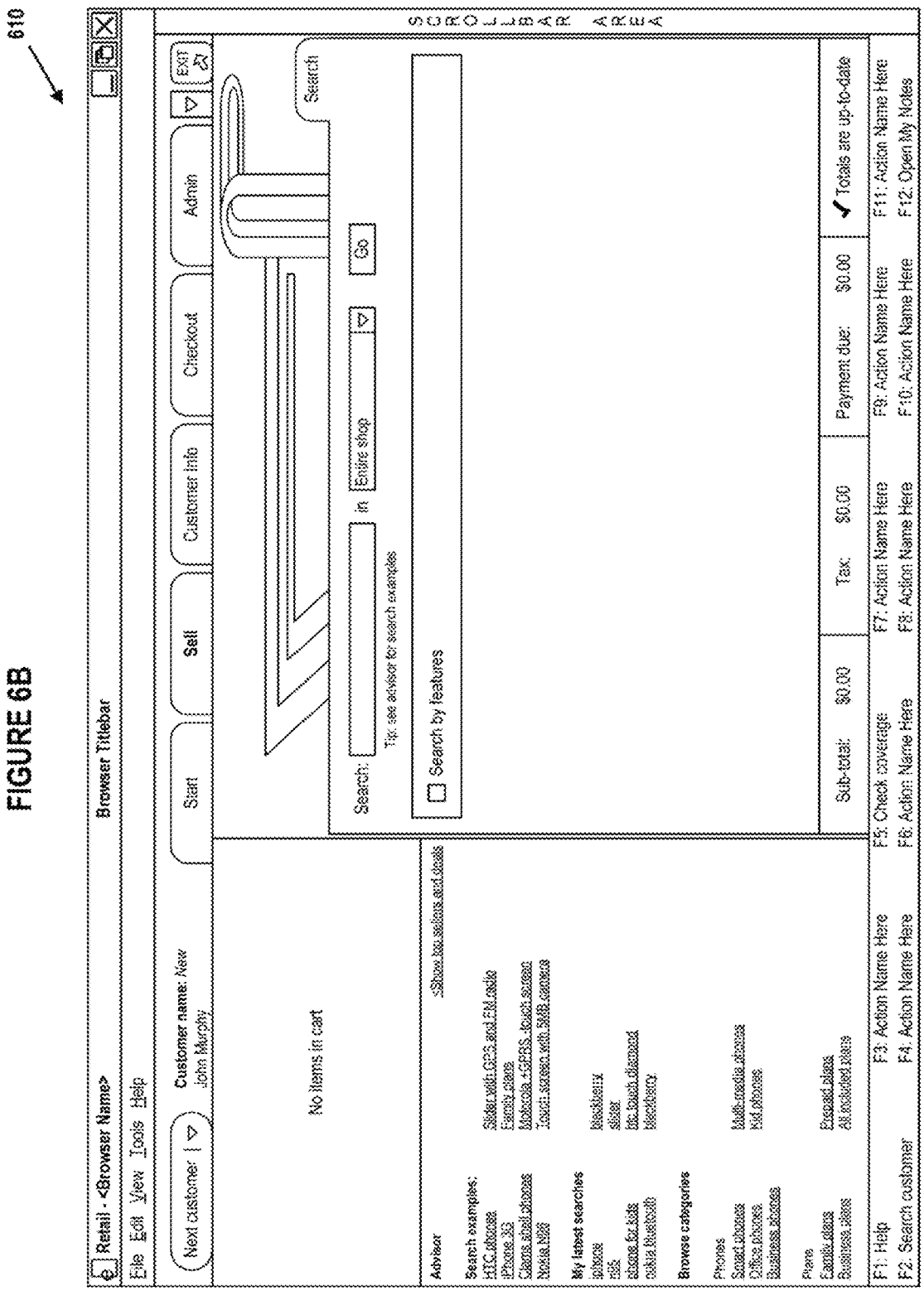
Figure 6C:
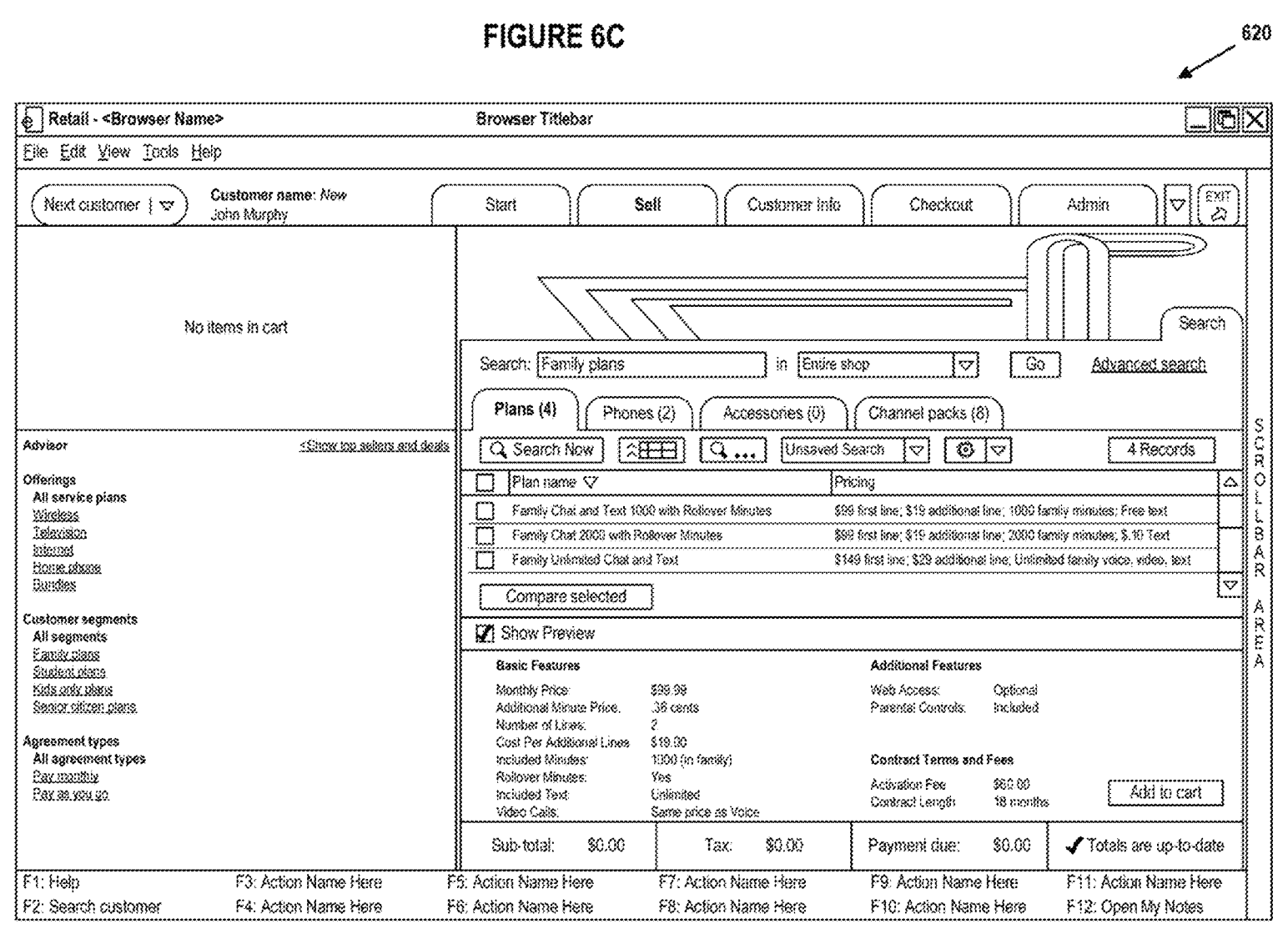
Figure 6D:
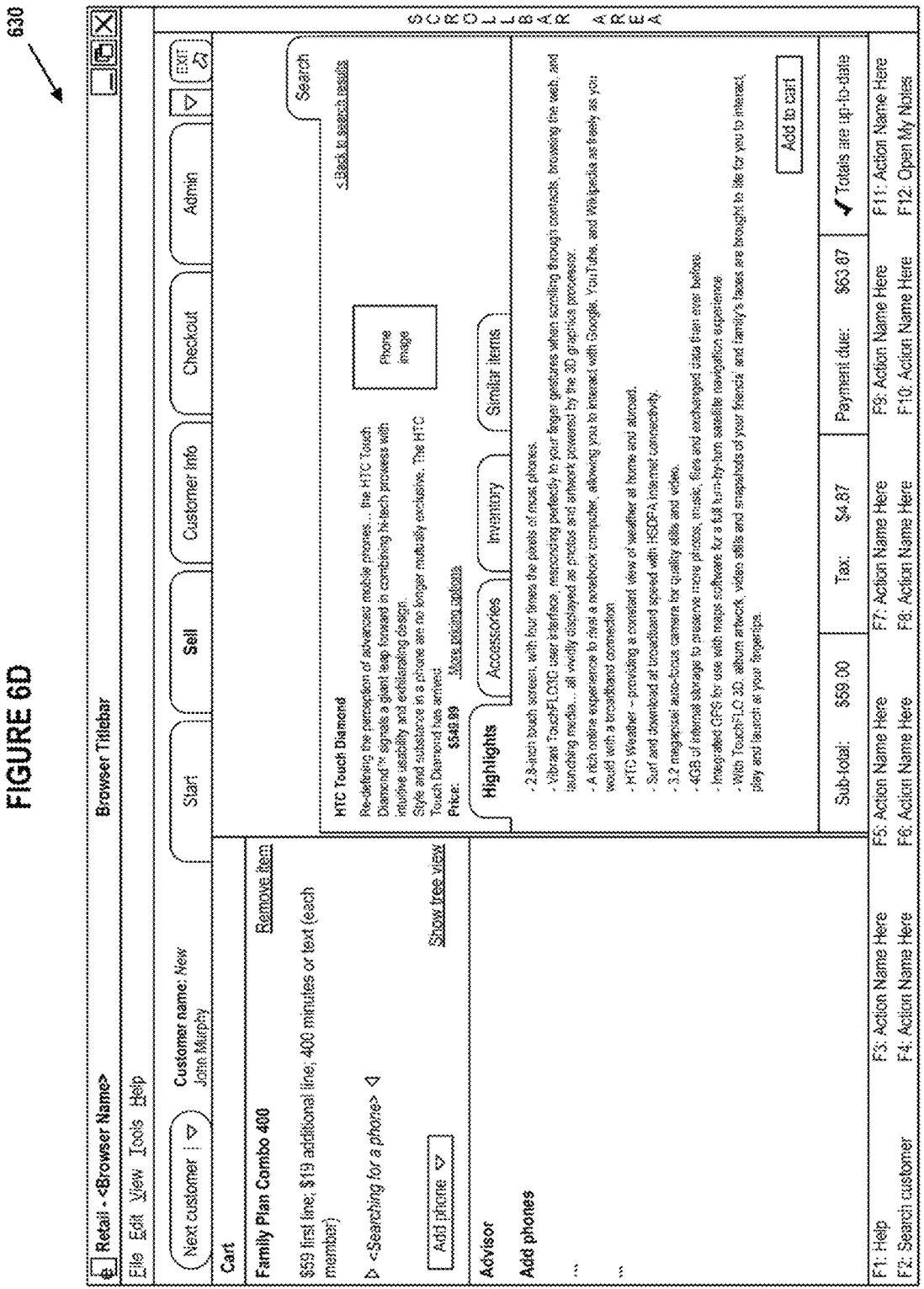

Rick then checks for family offers in the product catalog via the GUI 610 shows in FIG. 6B. The GUI 610 may be displayed to Rick upon Rick selecting the "Sell" tab of the GUI 600 of FIG. 6A, for example. In one embodiment, Rick may check for family offers by performing a search utilizing a search field of the GUI 610.

As a result of the search, information regarding several options for service offers is displayed, as shown in the GUI 620 of FIG. 6C. Rick may thus utilize the displayed information shown to inform the Murphy's of the various available service offers. The Murphy's may inform Rick of one of the service offers that they prefer such that Rick may select the preferred service offer via the GUI 620. Additional information on such service offer is displayed via the GUI 630 of FIG. 6D, and Rick may relay such information to the Murphy's to provide them more details about the associated service offer.

Further, the Murphy's may select the offered service for purchase (e.g. by selecting to add the service to the cart via the 'Add to Cart' option in the GUI 630. Upon selection of the service for purchase, another GUI 640 (shown in FIG. 6E) is displayed for use in selecting mobile phones to be utilized with the service to be purchased. Rick may tell the Murphy's that they are to select mobile phones to be used with the service and may ask the Murphy's if they have any preferences for mobile phones. If Mary tells Rick that she prefers a flip phone she saw in a display of the Purple CSP Retail Store, but not in the color blue, Rick may perform a search via the GUI 640 for such mobile phone (e.g. via the search tab of the GUI 640).

The results of the search are displayed and Rick informs Mary that he has the mobile phone she prefers in green and black in stock. Rick also mentions that a pink version is available and he can order it for her. Mary then asks if there is a white version of the mobile phone. Rick selects the "Similar Items" tab of the GUI 640 and views the recommended alternatives to determine if there is a similar model of the mobile phone in the color white.

Rick finds one mobile phone matching Mary's preference, but he notes from the GUI 640 that it costs $100 more. Rick informs Mary about the mobile phone and the price and also mentions it has a global positioning system (GPS) and wireless Internet (WiFi). He also tells Mary that it is a newer model. Rick further notes from the information displayed on the GUI 640 that there is a usage restriction on this phone so he informs Mary that she cannot connect to high speed Internet (3G networks) in Europe. Mary says she has no plans to visit Europe soon and that the restriction is acceptable.

John intervenes and says he needs these capabilities on his phone as he has business trips to Europe from time to time. Rick says he'll remember that when they are selecting John's mobile phone and makes a note of such preference via the GUI 640. Mary is interested to see the mobile phone she has selected, so Rick looks online for the storage location and brings her the mobile phone.

Mary looks at it and says she likes it but it's a bit more expensive than she planned. She asks if there are any other substantial differences from the other model (e.g. the non-white model). Rick compares the two models by selecting the option via the GUI 640 to compare the mobile phones and tells her, based on the comparison results displayed, that the newer one has a better built-in camera and Carl Zeiss lenses. She discusses these two options with John and finally decides to go for the newer model in white.

Rick adds the mobile phone and another GUI 650 (shown in FIG. 6F) is displayed to configure the added mobile phone. The other GUI 650 may be displayed upon selection of a settings tab associated with the mobile phone (as listed in the virtual shopping cart). Rick asks John if he also saw a mobile phone he prefers. John says he's not sure but he wants a mobile phone with full keyboard that will allow him to manage his office mail.

Rick uses the GUI 610 of FIG. 6B to search by feature, thus filtering only phones with Worldwide Internet access), and receives search results showing nine matches. He tells John that the price range is between $199 and $749. John says he does not want to spend more than $400 so Rick filters the phones by price. As a result, six mobile phones matching the criteria are displayed. Rick notes that three are phones by Blackberry®, two by Lotov and one by HTC. John says he has his friend Mark who had really bad experience with Lotov so Rick filters out Lotov from the search results.

Rick selects an option to preview the mobile phones listed and notices that the HTC mobile phone does not seem to have a keyboard so he checks the handset specifications and realizes that the keyboard is a virtual one, since this is a fully touch screen phone. John says he prefers a conventional keyboard phone, so Rick further filters the search results based on the updated preference such that only three mobile phones are included in the search results.

Figure 6E:
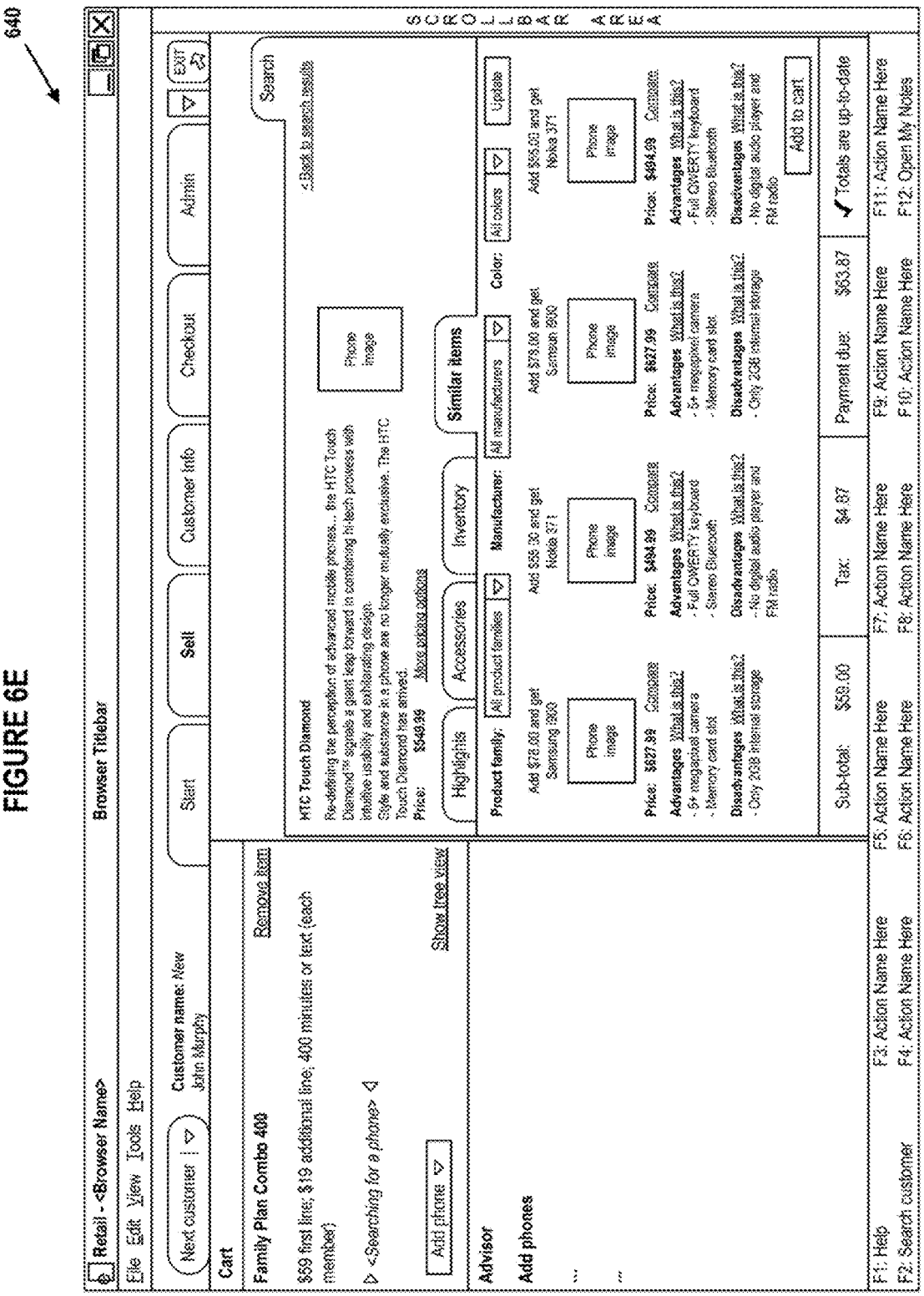
Figure 6F:
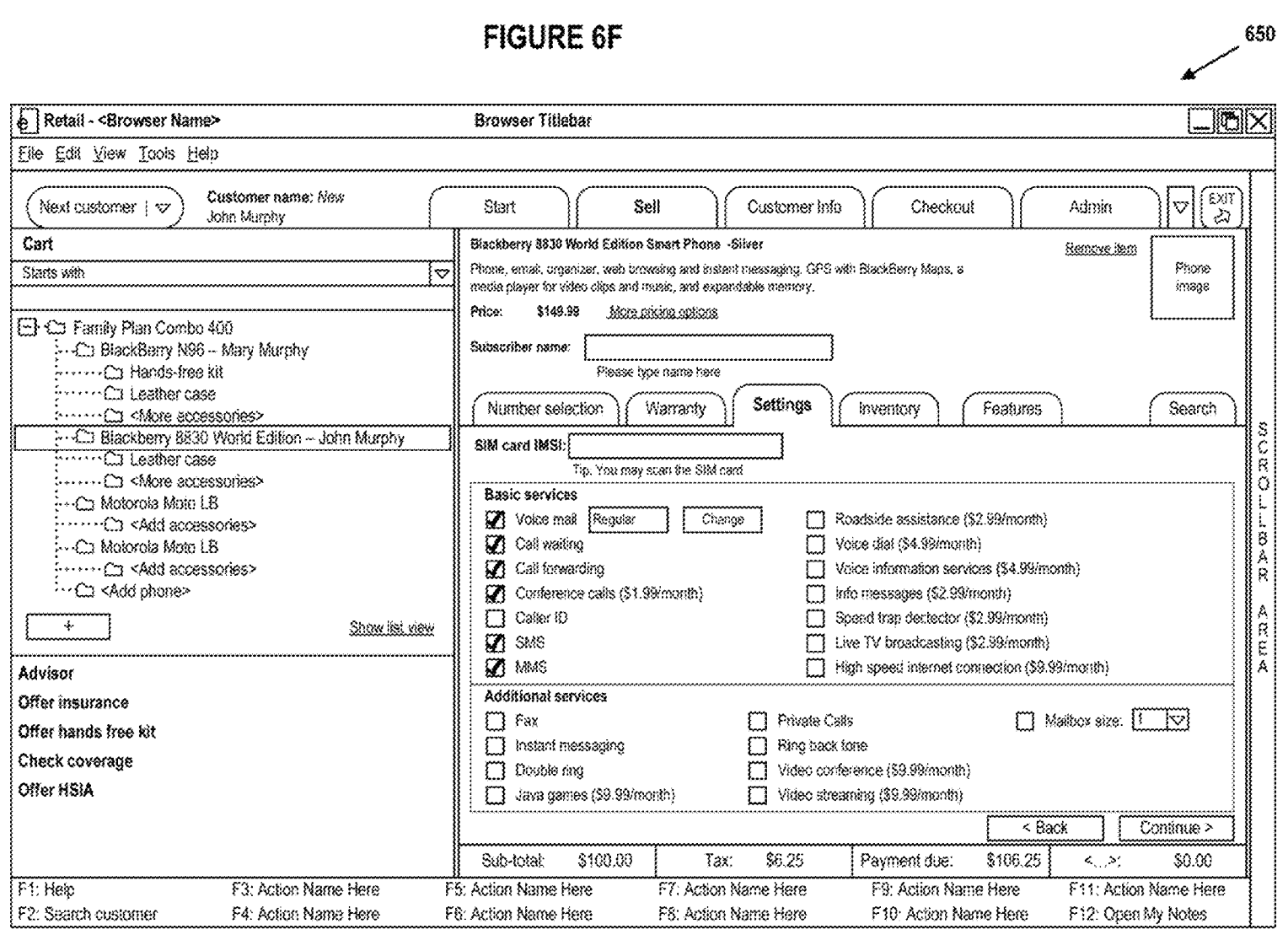
Figure 6G:
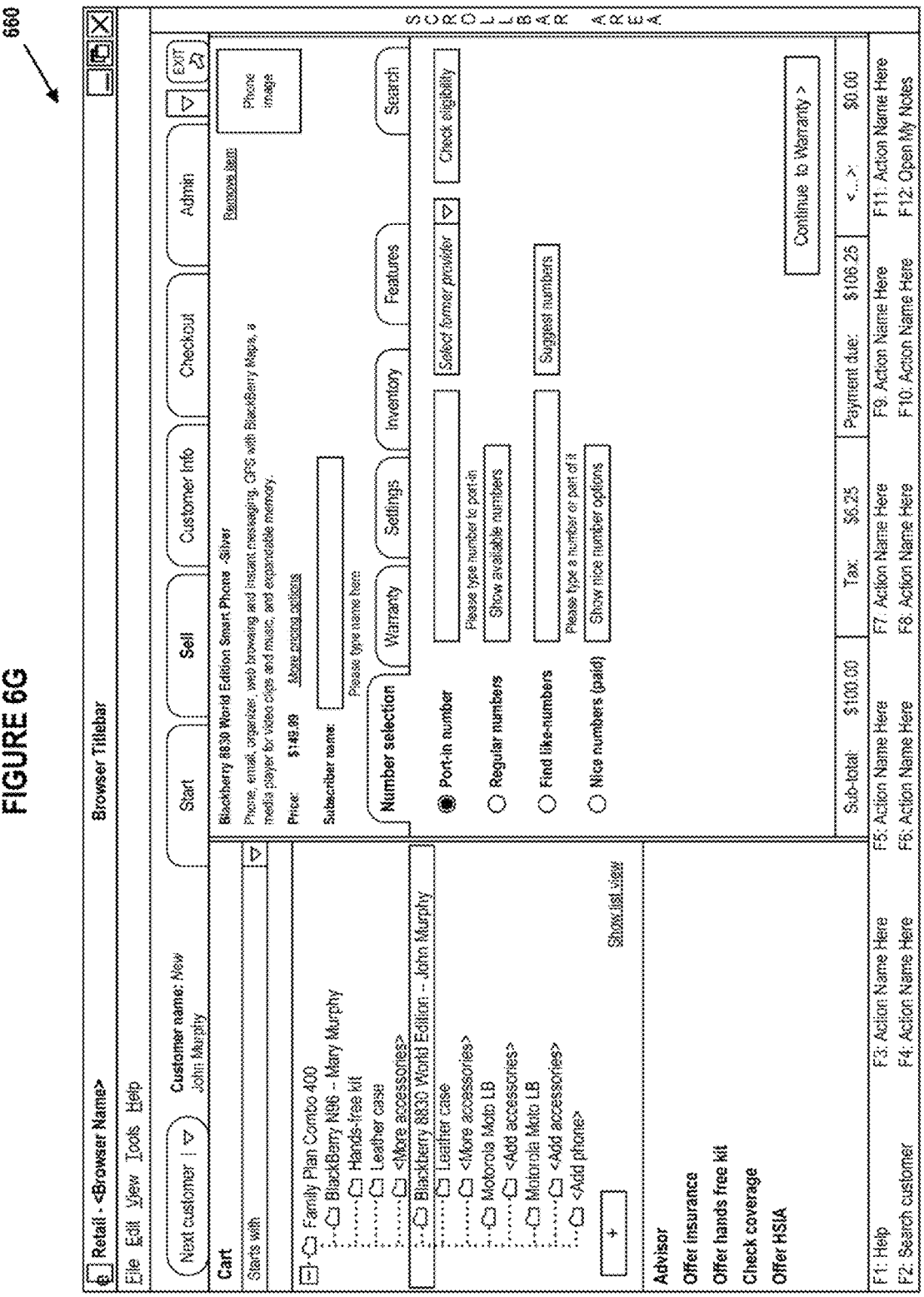

Rick runs a quick comparison between the Blackberry phones via the GUI 640 of FIG. 6E and notices that one phone has no built-in camera and asks John if this is acceptable. John says he does not want a phone without a camera, so Rick filters out mobile phones without a camera such that the search results only have two Blackberry phones listed therein. Rick suggests bringing the two Blackberry phones so that John can physically touch and view them. John is happy with one of the Blackberry phones, as its keyboard is larger and easier for him to use. Rick mentions that high speed wireless Internet may not be available in all areas and asks John if he wants him to check any specific locations.

John says he want to check the availability at home and work areas, and in South Texas, since the Murphy's visit his parents once a month. Rick selects an option to check service availability in various areas and a pop-up GUI is displayed for use in checking such availability. Rick checks the home location (using the zip code he already entered), the office (based on the city name, as John doesn't remember the zip code) and Texas, based on State. He informs John that there seems to be full coverage at home and work areas but in South Texas there are some areas with only 2.5G coverage and reassures him that he will be able to connect at low speed. John accepts these terms.

Rick asks if there are any special requests for the kids' phones and Mary asks for cheap durable phones with MPEG-1 Audio Layer 3 (MP3) and frequency modulation (FM) radio. Rick uses the GUI 610 of FIG. 6B to search for phones for kids based on filters for MP3 and FM radio and confirms the selections with Mary. John is a bit worried about the cost—$89 per unit, as shown in a pricing options pop-up GUI of the item details tab, so Rick suggests refurbished models for just $29 each. He assures John and Mary that these are fully tested and guaranteed.

Mary selects one purple phone for one child and a blue one for the other child. At this stage, Rick proceeds with handling the phones. After scanning each of the mobile phones using its barcode, at least one GUI is displayed for entering additional details for the mobile phone, such as number selection, warranty, etc. The parent phones are automatically associated with the previous selections in the cart. The two kid phones are newly added to the cart. The inventory meanwhile is updated automatically by the system.

Rick asks if they want to keep their current number from their provider and John confirms this for Mary and his own phone. The kids didn't have a phone previously. Thus, Rick selects to open a number selection GUI 660 (shown in FIG. 6G) to be used for selecting phone numbers to be associated with the mobile phones. Rick asks for the phone numbers they want to port for these phones and enters these numbers and checks whether they are eligible to port-in. Rick offers John and Mary two sequential numbers for their kids and they agree that the phone numbers are acceptable.

Rick goes through the additional options and John decides to add insurance plans for the two expensive phones and a text package. John also asks to restrict the kids' phones to nationwide calls only, and such preference is entered via a GUI (not shown). Once the mobile phones are configured, Rick attempts to cross-sell to the Murphy's by encouraging them to add accessories to these handsets because there is a "Buy two and get one free" promotion. John adds Bluetooth hand-free kits for the Blackberry and his wife's phone and a leather case for Mary's phone is also added for free. Rick scans these items as well and the virtual shopping cart is updated. The checkout for all of the virtual shopping cart items is performed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
   receiving at a system a plurality of user interactions with a good or service, the plurality of user interactions including:
      a submission of a search term as a query to a database of the system that results in a list including at least the good or service,
      a selection of the good or service from the list,
      a viewing of a description of the good or service that is displayed in response to the selection,
      a storing of the good or service in a virtual shopping cart provided by the system,
      a customization of the good or service, including a submission of one or more values by a user into one or more configurable fields provided by the system that are associated with the good or service, and
      a comparison of the good or service to an additional good or service;
   creating by the system a single data object associated with the good or service, the single data object stored in a hardware database of the system;
   storing in the hardware database of the system information associated with each of the received plurality of user interactions in the single data object associated with the good or service, the information including:
      an identification of the good or service,
      an identification of the at least one additional good or service,
      an identification of the submission of the search term,
      an identification of the selection of the good or service,
      an identification of the viewing of the description of the good or service,
      an identification of the storing of the good or service in the virtual shopping cart,
      an identification of the customization of the good or service,
      an identification of the comparison of the good or service to the additional good or service,
      results of the query to the database, and
      results of the comparison of the good or service to the additional good or service;
   receiving by the system a user request to view the information associated with each of the received plurality of user interactions;
   displaying by the system the stored information as a plurality of links, where each of the plurality of links is associated with one of the plurality of user interactions;
   receiving by the system a request by the user for the results of the comparison of the good or service to the additional good or service, including receiving by the system a selection by the user of one of the displayed plurality of links associated with the results of the comparison;
   retrieving by the system from the single data object the results of the comparison of the good or service to the additional good or service;
   displaying by the system to the user the retrieved results of the comparison of the good or service to the additional good or service;
   receiving by the system a selection of the additional good or service for purchase by the user, utilizing the displayed results of the comparison;
   migrating, by the system, a configuration associated with the customization of the good or service to the additional good or service, in response to the selection of the additional good or service, such that the one or more values are submitted into the one or more configurable fields associated with the additional good or service; and
   deleting by the system the single object associated with the good or service, in response to the selection of the additional good or service for purchase by the user.

2. The computer program of claim 1, wherein the graphical user interface includes a web page.

3. The computer program of claim 1, wherein the graphical user interface includes an electronic commerce graphical user interface capable of being utilized for performing an electronic transaction associated with the one of the good and the service.

4. The computer program of claim 1, wherein the information is displayed via another graphical user interface.

5. The computer program of claim 1, wherein the single object includes an object of an object-oriented programming model.

6. The computer program of claim 1, wherein the single object is stored in a database of objects.

7. The computer program of claim 1, wherein the information associated with the user interactions includes a unique identifier for the one of the good or and the service.

8. The computer program of claim 7, wherein the unique identifier for the one of the good and the service includes one or more of a model number and a title.

9. A method, comprising:
   receiving at a system a plurality of user interactions with a good or service, the plurality of user interactions including:
      a submission of a search term as a query to a database of the system that results in a list including at least the good or service,
      a selection of the good or service from the list,
      a viewing of a description of the good or service that is displayed in response to the selection,
      a storing of the good or service in a virtual shopping cart provided by the system,
      a customization of the good or service, including a submission of one or more values by a user into one or more configurable fields provided by the system that are associated with the good or service, and
      a comparison of the good or service to an additional good or service;
   creating by the system a single data object associated with the good or service, the single data object stored in a hardware database of the system;
   storing in the hardware database of the system information associated with each of the received plurality of user interactions in the single data object associated with the good or service, the information including:
      an identification of the good or service,
      an identification of the at least one additional good or service,
      an identification of the submission of the search term,
      an identification of the selection of the good or service,
      an identification of the viewing of the description of the good or service, an identification of the storing of the good or service in the virtual shopping cart, an identification of the customization of the good or service, an identification of the comparison of the good or service to the additional good or service, results of the query to the database, and results of the comparison of the good or service to the additional good or service;

receiving by the system a user request to view the information associated with each of the received plurality of user interactions;

displaying by the system the stored information as a plurality of links, where each of the plurality of links is associated with one of the plurality of user interactions;

receiving by the system a request by the user for the results of the comparison of the good or service to the additional good or service, including receiving by the system a selection by the user of one of the displayed plurality of links associated with the results of the comparison;

retrieving by the system from the single data object the results of the comparison of the good or service to the additional good or service;

displaying by the system to the user the retrieved results of the comparison of the good or service to the additional good or service;

receiving by the system a selection of the additional good or service for purchase by the user, utilizing the displayed results of the comparison;

migrating, by the system, a configuration associated with the customization of the good or service to the additional good or service, in response to the selection of the additional good or service, such that the one or more values are submitted into the one or more configurable fields associated with the additional good or service; and deleting by the system the single object associated with the good or service, in response to the selection of the additional good or service for purchase by the user.

10. A system, comprising:

a processor for:

receiving at a system a plurality of user interactions with a good or service, the plurality of user interactions including:

a submission of a search term as a query to a database of the system that results in a list including at least the good or service, a selection of the good or service from the list, a viewing of a description of the good or service that is displayed in response to the selection, a storing of the good or service in a virtual shopping cart provided by the system, a customization of the good or service, including a submission of one or more values by a user into one or more configurable fields provided by the system that are associated with the good or service, and a comparison of the good or service to an additional good or service;

creating by the system a single data object associated with the good or service, the single data object stored in a hardware database of the system;

storing in the hardware database of the system information associated with each of the received plurality of user interactions in the single data object associated with the good or service, the information including:

an identification of the good or service, an identification of the at least one additional good or service, an identification of the submission of the search term, an identification of the selection of the good or service, an identification of the viewing of the description of the good or service, an identification of the storing of the good or service in the virtual shopping cart, an identification of the customization of the good or service, an identification of the comparison of the good or service to the additional good or service, results of the query to the database, and results of the comparison of the good or service to the additional good or service;

receiving by the system a user request to view the information associated with each of the received plurality of user interactions;

displaying by the system the stored information as a plurality of links, where each of the plurality of links is associated with one of the plurality of user interactions;

receiving by the system a request by the user for the results of the comparison of the good or service to the additional good or service, including receiving by the system a selection by the user of one of the displayed plurality of links associated with the results of the comparison;

retrieving by the system from the single data object the results of the comparison of the good or service to the additional good or service;

displaying by the system to the user the retrieved results of the comparison of the good or service to the additional good or service;

receiving by the system a selection of the additional good or service for purchase by the user, utilizing the displayed results of the comparison;

migrating, by the system, a configuration associated with the customization of the good or service to the additional good or service, in response to the selection of the additional good or service, such that the one or more values are submitted into the one or more configurable fields associated with the additional good or service; and deleting by the system the single object associated with the good or service, in response to the selection of the additional good or service for purchase by the user.

11. The system of claim 10, wherein the processor is coupled to memory via a bus.

* * * * *